United States Patent
Sessler et al.

[15] 3,705,312
[45] Dec. 5, 1972

[54] PREPARATION OF ELECTRET TRANSDUCER ELEMENTS BY APPLICATION OF CONTROLLED BREAKDOWN ELECTRIC FIELD

[72] Inventors: Gerhard Martin Sessler, Summit; James Edward West, Plainfield, both of N.J.

[73] Assignee: Bell Telephone Laboratories, Incorporated, Murray Hill, N.J.

[22] Filed: Nov. 2, 1970

[21] Appl. No.: 85,882

[52] U.S. Cl. ............ 307/88 ET, 179/111 E, 29/594, 29/195
[51] Int. Cl. .............................................. H04r 19/04
[58] Field of Search ....307/88 ET; 320/1; 340/173.2; 29/195, 25.41, 25.42, 594; 179/111 E; 161/216

[56] References Cited

UNITED STATES PATENTS 3,354,373   11/1967   Fatovic ................. 307/88 ET
3,449,094   6/1969    Baxt et al. ............. 307/88 ET

*Primary Examiner*—Stanley M. Urynowicz, Jr.
*Attorney*—R. J. Guenther and William L. Keefauver

[57] ABSTRACT

A thin film electret with excellent surface charge properties is produced by placing a thin polymer film between two electrodes together with a dielectric plate and by applying a voltage of about 30 keV across the resulting sandwich of elements for about 1 minute. The process is carried out at room temperature and at atmospheric pressure. By using an auxiliary dielectric plate that is much thicker than the film and has the proper resistivity, a high voltage drop can be applied across the film without a resulting destructive breakdown. Charge-densities of up to $1.5 \times 10^{-6}$ C/cm$^2$, which are greater by a factor of 3 than those previously reported, are produced.

11 Claims, 3 Drawing Figures

PATENTED DEC 5 1972  3,705,312

INVENTORS G. M. SESSLER
J. E. WEST
BY
G. E. Hirsch Jr.
ATTORNEY

PREPARATION OF ELECTRET TRANSDUCER ELEMENTS BY APPLICATION OF CONTROLLED BREAKDOWN ELECTRIC FIELD

This invention has to do with thin film electrets of the sort used as the vibratile diaphragm of electro-acoustic transducers, as precipitators, as data storage elements, as stators in electromotors, in electrometers, dosimeters, air filters, and as similar electronic components. More particularly, the invention is concerned with the fabrication of film electrets that have superior charge retention characteristics, both in dry and in humid atmospheres, that are essentially immune to temperature variations, and that exhibit extremely uniform charge densities.

BACKGROUND OF THE INVENTION

Dielectric materials in the form of thin films, for example, of various polymers such as polyesters, one of which is known by the brand name "Mylar," various fluorocarbons, such as the one available commercially with the brand name "Teflon," various polycarbonate resins and the like, are used extensively in a variety of applications. For example, they are used in electroacoustic transducers in the fabrication of capacitors, precipitators, dielectric storage elements, and the like. In a typical electroacoustic transducer, such as an electrostatic microphone or loud speaker, for example, a thin film of such a material is employed as the vibrating element. To avoid the need for external bias, the moving film is permanently polarized or charged; when so charged, it is known as an "electret" film. Film electret transducers, for example, of the sort described in Sessler-West U.S. Pat. No. 3,118,022, granted on Jan. 14, 1964, have all of the advantages of conventional capacitor units but virtually none of their disadvantages. Unlike the capacitor transducer, an electret unit requires no separate power supply and is mechanically much simpler. It also has a higher capacitance which allows greater freedom in circuit design. Perhaps even more importantly, it has high sensitivity, good frequency response, and low distortion.

Several methods of producing permanent electric charges on dielectric materials have been described in the art. Among these are thermal procedures using the simultaneous application of heat and an electric field, corona and Townsend discharge methods, and electron bombardment techniques using electron beams. Due to charge realignment, charge separation, or charge injection, these methods yield electrets characterized by a heterocharge, a homocharge, or a combination of both.

One of the most widely used arrangements for charging polymer films employs a system for impressing a relatively high voltage across a film held between a pair of electrodes. Typically a dielectric insert is sandwiched together with the film between the electrodes and the sandwiched elements are either in contact or held apart to establish air gaps between the layers. During application of voltage, breakdown occurs in one or more of the air gaps or in all, but not in the film. The resultant field impressed on the film therefore is insufficient to break it down but is nonetheless sufficient to form a homocharge. Because of the air gaps and local breakdown phenomena, charging of the film is inherently nonuniform, and the resultant surface-charge density of the electret is likewise nonuniform.

SUMMARY OF THE INVENTION

It is thus an object of this invention to fabricate thin film electrets which exhibit extremely high charge densities which exceed those achieved using prior art charging techniques. It is another object to assure large full trap densities in thin film electrets.

These and other objects are achieved in accordance with the invention by applying a field, of sufficient strength to cause breakdown in the polymer films, to a sandwich arrangement consisting of the polymer film which has a thin conductive layer bonded to one of its surfaces (the resulting film and conductive layer is commonly called a "metalized foil"), and another much thicker dielectric material of selected conductivity. By proportioning the dimensions of the dielectric insert and by selecting the material with the proper conductivity, the insert withstands the excitation applied to a pair of encompassing electrodes and does not itself breakdown. It is nonetheless able to control the actual breakdown of the polymer foil short of its destruction. No air gaps are needed; the elements of the sandwich may be held tightly together. By eliminating all air gaps, the possibility of nonuniform charging is also reduced. Processing in accordance with the invention may take place at room temperature and yet produce a uniform homocharge in the foil of high density and long life.

BRIEF DESCRIPTION OF THE DRAWINGS

The invention will be fully apprehended from the following detailed description of illustrative embodiments thereof taken in connection with the appended drawings in which.

DETAILED DESCRIPTION OF THE INVENTION

Figure 1:
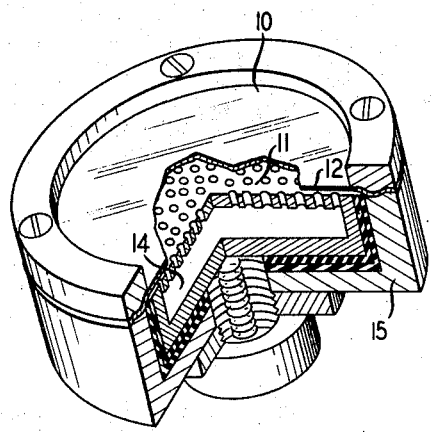
FIG. 1 illustrates in simplified form the construction of an electrostatic acoustic transducer which illustrates the manner in which a thin film electret is utilized as the vibrating element.

One of the most important uses for thin film electrets is in the field of electroacoustic transducers. Since the electret contains a permanent static charge, it is ideally suited for use as the vibrating element of an electrostatic transducer, no additional bias supply voltage is required when it is used. A typical electroacoustic transducer which employs a thin film electret is shown in FIG. 1. It consists of an electrically charged plastic film 10 stretched over a metal backplate 11. Typically, film 10 is composed of a polymer material, such as, polyethylene terephthalate (PET), known commercially as Mylar, or polyfluoroethylene-propylene, known commercially as Teflon FEP or Teflon TFE, and polycarbonate (PC) with a thickness of about 0.001 inch. An even thinner metal layer 12 is evaporated onto the side of the film not facing the backplate, i.e., the outer surface of film 10. The resultant film and conductive layer is termed a metalized "foil." The backplate surface is generally arranged so that the foil contacts its surface at discrete points or at long discrete lines only.

In the areas where no contact is made, shallow pockets permit it to vibrate when sound waves impinge on it. In addition, backplate 11 is perforated and supported above an air cavity 14. This arrangement reduces the stiffness of the air cushion behind the diaphragm and lets the film vibrate with a greater amplitude, thus to increase transducer sensitivity.

Because of the permanent charge on foil 10 – 12, an electric field is established between the foil and backplate 12. The foil and backplate are connected, by means not shown, to a high impedance input circuit. Motion of the foil, as a result of an impinging sound wave, for example, causes a small voltage to be generated in the input circuit. This voltage is proportional to sound pressure.

Reproducibility of the sensitivity of the electrostatic transducers discussed above, together with high sensitivity, good frequency response, and low distortion, depends, in large measure, on the uniformity of charge distribution throughout the body of the electret diaphragm, on the density of the electret charge, and on the ability of the electret to retain charge despite external influences. Thus, a useful lifetime depends on the low decay rate of the electret charge.

Figure 2:
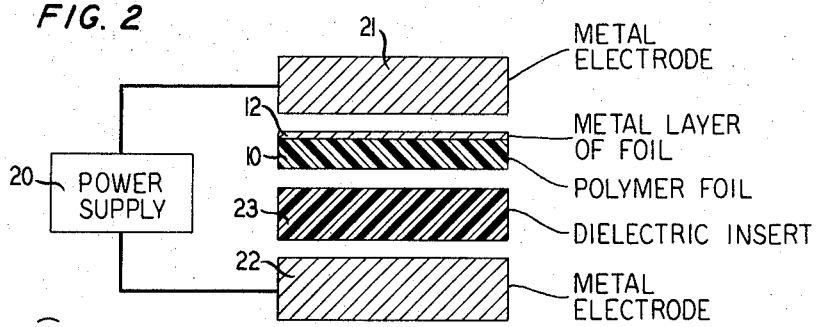
FIG. 2 illustrates schematically a suitable arrangement for preparing thin film electrets in accordance with the invention.

Electret films with the requisite properties for use as the vibrating element of an electrostatic transducer, as well as for other electret applications, are fabricated in accordance with the invention by applying a controlled electric field to a polymer foil sufficient to establish a voltage drop across the foil in excess of its breakdown voltage. FIG. 2 schematically illustrates a typical charging configuration.

As illustrated in FIG. 2, two metal electrodes, 21 and 22, each typically about 6 centimeters (cm) in diameter are employed to encompass a polymer foil 10 – 12 and an auxiliary dielectric insert 23. Typically, the foil is about 2 – 25 micro-meters ($\mu$m) thick and the dielectric plate 23 is formed of one or two sheets of soda-lime glass, each approximately 0.1 cm thick. Preferably the elements of the sandwich between the electrodes are held in close proximity to one another so that any irregular air gaps between the elements are the result of surface roughness only. For clarity of exposition, the extent of the air gaps between the elements shown in FIG. 2 is greatly exaggerated.

A voltage of about 30 kilovolts (kV) from a conventional power supply 20 is applied across the sandwich by way of electrodes 21 and 22 for a period of about 1 minute. This interval of application has been found to be optimum in practice. By properly choosing the voltage and the dielectric inserts, the current density will be in the range of $10^{-8}$ to $10^{-6}$ Amperes per square centimeter (A/cm$^2$), which was found optimal for this process. This value is much above a typical breakdown current for most polymer materials. A large part of the current flows through localized channels in the polymer and charge deposition probably occurs in areas remote from these channels. That is to say, breakdown occurs at discrete locations only. Yet, the remainder of the foil is subjected to a prebreakdown condition and charge deposition occurs primarily in the remainder; i.e., in areas of the foil remote from the point of breakdown. Application of heat is not necessary; application at normal room temperature is perfectly satisfactory. Following application, the sign of the charge on polymer film 10 corresponds to a homocharge. Depending upon the polarity of the applied electric field, the film has a net positive or net negative charge on its nonmetallized side. Of course, a voltage in the prebreakdown range across the film also produces some charge deposition but the resulting electret charge density is correspondingly smaller.

A glass insert 23 is preferred for controlling polymer breakdown because it has a resistance sufficiently high, on the order of $10^9$ to $10^{12}$ ohms for an area of 10 to 100 cm$^2$, to prevent the breakdown from becoming destructive, yet low enough to allow a sufficiently high voltage to develop across the polymer. Furthermore, a glass insert makes the spacing of the electrodes relatively uniform and thus allows a greater field to be applied across the polymer for the same electrode smoothness than would be possible without an insert. It has been found in practice that the field in a dielectric insert 23 composed of layers of soda-lime glass is on the order of 250 kV/cm, which is a value in the prebreakdown range.

The greatest effective surface charge densities found for three representative polymer films of various thicknesses, each metallized on one side and charged in accordance with the invention, are tabulated below. Densities, as measured by a nondestructive method, for both charge polarities are shown. These values, obtained about 60 seconds after the termination of the charging process, are given as deviations from a nominal value of $10^{-6}$ C/cm$^2$. In addition, full trap densities for these materials, calculated from the charge densities, are shown in the last column of the table.

| Material | Thickness t ($\mu$m) | Effective Surface— Charge Density ($10^{-6}$ C/cm$^2$) | Full-Trap Density ($10^{16}$ cm$^{-3}$) |
| --- | --- | --- | --- |
| PET | 3.8 | +1.0 | 3.3 |
|  |  | −1.0 | 4.0 |
|  | 12.7 | +1.0 | 1.0 |
|  |  | −1.4 | 1.4 |
|  | 25.4 | +0.6 | 0.3 |
|  |  | −0.9 | 0.4 |
| FEP | 12.7 | +0.4 | 0.4 |
|  |  | −0.5 | 0.5 |
|  | 25.4 | +0.5 | 0.2 |
|  |  | −0.5 | 0.2 |
| PC | 2 | +1.0 | 6.0 |
|  |  | −1.0 | 6.0 |
|  | 12.7 | +0.6 | 0.6 |
|  |  | −0.8 | 0.8 |

The internal fields corresponding to the greatest charge densities, as shown in the table, are, for example, 4 × $10^6$ V/cm for PET and are thus just below the breakdown fields. The greatest effective surface charge does not increase with foil thickness because the charges are initially trapped within a narrow layer, probably close to the surface.

Figure 3:
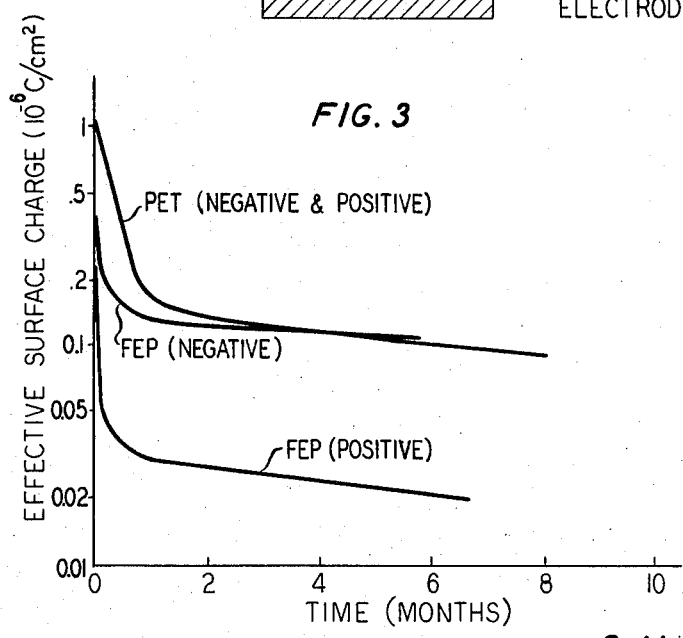
FIG. 3 illustrates effective surface charge as a function of time after charging on various thin film electrets prepared in accordance with the principles of the invention.

Surface charge as a function of time of several PET and FEP electrets stored in a desiccator is illustrated by way of example in FIG. 3. Four to 8 months after charging the negative and positive charges on PET are still about 2 to 3 times greater than on foils produced with corona discharge or by electron bombardment. Positively charged FEP electrets have been found to be subject to a more rapid charge decay than the negatively charged ones.

As opposed to thermal electrets, low temperature currents due to depolarization of heterocharges are very minute. The absence of a large heterocharge is attributed to the fact that charging takes place at room temperature. Moreover, the high temperature current due to homocharge depolarization from PET charged with this method shows two maxima. This indicates the presence of two trap depths which may be related to the glass transition and the relaxation of gylcol linkages in the foil.

What is claimed is:

1. Apparatus for electrostatically charging a polymer material to form an electret, which comprises,
    a pair of plane conductive electrodes supported, respectively, on the opposite sides of a thin foil of polymer material metallized on one of its surfaces,
    an auxiliary dielectric insert sandwich between said foil and one of said electrodes, said dielectric insert having a resistance sufficiently high to permit nondestructive breakdown of said foil, yet low enough to allow a sufficiently high voltage to be developed across said foil,
    said foil, auxiliary dielectric insert, and encompassing electrodes being held together,
    means for applying a voltage between said electrodes high enough to cause nondestructive breakdown in said foil in localized channels and low enough to cause prebreakdown in said insert, and
    means for maintaining said voltage for an interval of about one minute to charge areas of said foil remote from said channels.

2. Apparatus for electrically charging a thin polymer foil, as defined in claim 1, wherein,
    said auxiliary dielectric insert comprises at least one sheet of soda-lime glass approximately 0.1 cm thick.

3. Apparatus for electrostatically charging a thin polymer foil, as defined in claim 1, wherein,
    the thickness of said polymer foil and the thickness of said auxiliary dielectric insert are proportioned to establish a steady state current density within the critical range of about $10^{-8}$ to $10^{-6}$ A/cm$^2$.

4. Apparatus for electrostatically charging a thin polymer foil, as defined in claim 1, wherein,
    said auxiliary dielectric insert has a resistance in the range $10^9$ to $10^{12}$ ohms for an area of 10 to 100 cm$^2$.

5. Apparatus for electrostatically charging a thin polymer foil, as defined in claim 1, wherein,
    said auxiliary dielectric insert has a resistance sufficiently high to induce breakdown of said foil but low enough to allow a relatively high voltage to be developed across said polymer foil.

6. Apparatus for electrostatically charging a thin polymer foil, as defined in claim 1, wherein,
    said voltage applied between said electrodes is of approximately 30 kV.

7. The method of fabricating a foil electret characterized by a charge density in excess of $0.5 \times 10^{-6}$ C/cm$^2$, which comprises the steps of:
    sandwiching a foil of polymer material and an auxiliary dielectric plate having a resistance sufficiently high to permit nondestructive breakdown of said foil, together between a pair of plane conductive electrodes,
    compressing said electrodes to hold said sandwich of foil and dielectric in close contact,
    applying a sufficiently high voltage between said electrodes to cause said foil to break down in localized channels, but not sufficiently high to cause said dielectric plate to break down, and
    maintaining said voltage between said electrodes for an interval of about one minute to charge areas of said foil remote from said channels.

8. A foil electret characterized by a charge density in excess of $0.5 \times 10^{-6}$ C/cm$^2$ prepared in accordance with the method defined in claim 7.

9. The method of fabricating an electret transducer, which comprises the steps of:
    preparing an electret diaphragm from a thin polymer film metallized on one of its surfaces by supporting said film between two electrodes,
    inserting a dielectric plate having a resistance sufficiently high to permit nondestructive breakdown of said film between the nonmetallized surface of said film and one of said electrodes, and supplying a voltage of approximately 30 keV between said electrodes for about 1 minute; and
    supporting said electret diaphragm in juxtaposition to a conductive backplate.

10. The method of fabricating an electret transducer, as defined in claim 9, wherein,
    said vibratile diaphragm is prepared at normal room temperature.

11. The method of fabricating an electret transducer as defined in claim 9, wherein,
    said dielectric plate employed in preparing said vibratile diaphragm comprises at least two sheets of soda-lime glass, each approximately 0.1 cm thick and each exhibiting a resistance of at least $10^{10}$ ohms.

* * * * *

UNITED STATES PATENT OFFICE
CERTIFICATE OF CORRECTION

Patent No. 3,705,312         Dated December 5, 1972

Inventor(s) Gerhard Martin Sessler and James Edward West

It is certified that error appears in the above-identified patent and that said Letters Patent are hereby corrected as shown below:

Column 4, line 40,   under the second column of the table, headed "Effective Surface-Charge Density", the second numeral listed as "-1.0" should read -- -1.2 --.

Column 5, line 17,   the word "sandwich" should read --sandwiched--.

Signed and sealed this 29th day of May 1973.

(SEAL)
Attest:

EDWARD M. FLETCHER, JR.　　　　　　　ROBERT GOTTSCHALK
Attesting Officer　　　　　　　　　　Commissioner of Patents